United States Patent
Pettey

(10) Patent No.: US 11,011,957 B2
(45) Date of Patent: May 18, 2021

(54) SERVO SHAFT COUPLERS

(71) Applicant: Brian T. Pettey, Winfield, KS (US)

(72) Inventor: Brian T. Pettey, Winfield, KS (US)

(73) Assignee: Robotzone, LLC, Winfield, KS (US)

( * ) Notice: Subject to any disclaimer, the term of this patent is extended or adjusted under 35 U.S.C. 154(b) by 617 days.

(21) Appl. No.: 15/812,236

(22) Filed: Nov. 14, 2017

(65) Prior Publication Data

US 2018/0138778 A1 May 17, 2018

Related U.S. Application Data

(60) Provisional application No. 62/422,104, filed on Nov. 15, 2016.

(51) Int. Cl.
| | |
|---|---|
| *H02K 7/00* | (2006.01) |
| *F16D 1/08* | (2006.01) |
| *F16D 1/04* | (2006.01) |
| *F16D 1/10* | (2006.01) |

(52) U.S. Cl.
CPC ............... *H02K 7/003* (2013.01); *F16D 1/04* (2013.01); *F16D 1/0847* (2013.01); *F16D 1/0864* (2013.01); *F16D 2001/103* (2013.01)

(58) Field of Classification Search
CPC ......... H02K 7/003; F16D 1/04; F16D 1/0847; F16D 1/0864
See application file for complete search history.

(56) References Cited

U.S. PATENT DOCUMENTS

| | | |
|---|---|---|
| 2,348,071 A | 5/1944 | Johnstone |
| 2,364,599 A | 12/1944 | Burrus |
| 2,838,329 A | 6/1958 | Pressley |
| 2,703,847 A | 3/1966 | Kalikow |
| 3,735,164 A | 5/1973 | Linn et al. |
| 3,820,357 A | 6/1974 | Allison |
| 4,009,623 A | 3/1977 | Smith et al. |

(Continued)

OTHER PUBLICATIONS

Anderson, D.; "Improving Servo Positioning Accuracy," http://www.seattlerobotics.org/encoder/200010/servohac.html pp. 1-9.

(Continued)

*Primary Examiner* — Terrance L Kenerly
(74) *Attorney, Agent, or Firm* — Wesley W. Malherek; Kelly, Holt & Christenson PLLC

(57) ABSTRACT

A coupler for coupling an output shaft of a servo to an auxiliary shaft, comprises an coupler body having a longitudinal axis extending from a first end to a second end. The coupler body comprises a first bore, configured to accept a portion of the auxiliary shaft, centered on the longitudinal axis and extending into the first end a first distance. The coupler also comprises a second bore centered on the longitudinal axis and extending into the second end a second distance. The coupler also comprises a first fastener disposed proximate the first end, wherein adjusting the first fastener deforms a cross sectional dimension of the first bore. The coupler also comprises a second fastener disposed proximate the second end, wherein adjusting the second fastener deforms a cross sectional dimension of the second bore. An inner surface of the second bore has a female spline configuration to accept and engage a portion of the output shaft of the servo.

17 Claims, 9 Drawing Sheets

(56) References Cited

U.S. PATENT DOCUMENTS

| | | |
|---|---|---|
| 4,081,705 A | 3/1978 | Johnson |
| 4,121,532 A | 10/1978 | Coryell, III |
| 4,429,204 A | 1/1984 | McGuire et al. |
| 4,565,404 A | 1/1986 | Nilsson |
| 4,728,218 A | 3/1988 | Durham |
| 4,789,376 A | 12/1988 | Grant |
| 5,006,087 A | 4/1991 | Fischer et al. |
| 5,062,734 A | 11/1991 | Vanzee et al. |
| 5,492,024 A | 2/1996 | Siner |
| 5,533,712 A | 7/1996 | Fujikawa et al. |
| 5,655,849 A | 8/1997 | McEwen et al. |
| 5,762,439 A | 6/1998 | Siner |
| 5,855,145 A | 1/1999 | Hosoi et al. |
| 6,234,506 B1 | 5/2001 | Li |
| 6,506,120 B1 | 1/2003 | Lockwood |
| 6,595,083 B2 | 7/2003 | Hosoi et al. |
| 6,682,432 B1 * | 1/2004 | Shinozuka .............. F16B 2/065 464/78 |
| 6,716,104 B2 | 4/2004 | MacDonald |
| 6,840,701 B2 | 1/2005 | DaCunha et al. |
| 6,872,023 B2 | 3/2005 | Liao |
| 7,270,589 B1 | 9/2007 | Brown, Jr. et al. |
| 7,285,884 B2 | 10/2007 | Pettey |
| 7,336,009 B2 | 2/2008 | Pettey |
| 7,448,821 B2 | 11/2008 | Meyer |
| 7,501,731 B2 | 3/2009 | Pettey |
| 7,671,497 B2 | 3/2010 | Pettey |
| 7,859,161 B2 | 12/2010 | Pettey |
| 7,891,902 B2 * | 2/2011 | Pettey ...................... F16C 3/00 403/305 |
| 2004/0237679 A1 | 12/2004 | Enright |
| 2006/0105844 A1 | 5/2006 | Sweet et al. |
| 2006/0213319 A1 | 9/2006 | Pettey |
| 2009/0066198 A1 | 3/2009 | Pettey |

OTHER PUBLICATIONS

Anderson, D.; "Improving Servo Positioning Accuracy," http://web.archive.org/web/*/http://www.geology.smu.edu/~dpa-www/robo/servo/servohac.htm. pp. 1-8.

Wheat. D.: "Hacking the Tower Hobbies TS-53 Servo," DPRG: http://web.archive.org/web/20040623092815/dprg.org/projects/2003-5a/, May 9, 2003 pp. 1-5.

Brown, J.; "Sub Micro Servo Motor Hack," DPRG http://web.archive.org/web/20040622205626/dprg.org/projects/1998-04b/ Apr. 1998, pp. 1-9.

Anderson, D.; "Improving Servo Positioning Accuracy," DPRG, http://www.dprg.org/projects/2000-09a/?. Sep. 19, 2000. pp. 1-5.

\* cited by examiner

SERVO SHAFT COUPLERS

CROSS-REFERENCE TO RELATED APPLICATION

The present application is based on and claims the benefit of U.S. provisional patent application Ser. No. 62/422,104, filed Nov. 15, 2016, the content of which is hereby incorporated by reference in its entirety.

BACKGROUND

A servo motor (a.k.a. simply a "servo") is a device having a rotatable output shaft. The output shaft can typically be positioned to specific angular positions in accordance with a coded signal received by the servo. It is common that a particular angular position will be maintained as long as a corresponding coded signal exists on an input line. If the coded signal changes, the angular position of the shaft will change accordingly. Control circuits and a potentiometer are typically included within the servo motor casing and are functionally connected to the output shaft. Through the potentiometer (e.g., a variable resistor), the control circuitry is able to monitor the angle of the output shaft. If the shaft is at the correct angle, the motor actuates no further changes. If the shaft is not at the correct angle, the motor is actuated in an appropriate direction until the angle is correct.

SUMMARY

A coupler for coupling an output shaft of a servo to an auxiliary shaft, comprises an coupler body having a longitudinal axis extending from a first end to a second end. The coupler body comprises a first bore, configured to accept a portion of the auxiliary shaft, centered on the longitudinal axis and extending into the first end a first distance. The coupler also comprises a second bore centered on the longitudinal axis and extending into the second end a second distance. The coupler also comprises a first fastener disposed proximate the first end, wherein adjusting the first fastener deforms a cross sectional dimension of the first bore. The coupler also comprises a second fastener disposed proximate the second end, wherein adjusting the second fastener deforms a cross sectional dimension of the second bore. An inner surface of the second bore has a female spline configuration to accept and engage a portion of the output shaft of the servo.

DETAILED DESCRIPTION OF ILLUSTRATIVE EXAMPLES

An adapter may be used to couple the rotatable output shaft of a servo motor to an auxiliary shaft. In order to connect the adapter to the rotatable output shaft, the adapter may further comprise a broached insert that is pressed into an input bore of the adapter. This broached insert is configured to receive any number of ridges (or teeth) that are distributed around an outside surface of the rotatable output shaft. Thus, the broached insert is a "female" spline receiver configured to receive a "male" spline configuration of the rotatable output shaft. For example, U.S. Pat. No. 7,891,902 includes an adapter configured to receive a broached insert that is used to attach the adapter to a rotatable output shaft of a servo motor.

Figure 1:
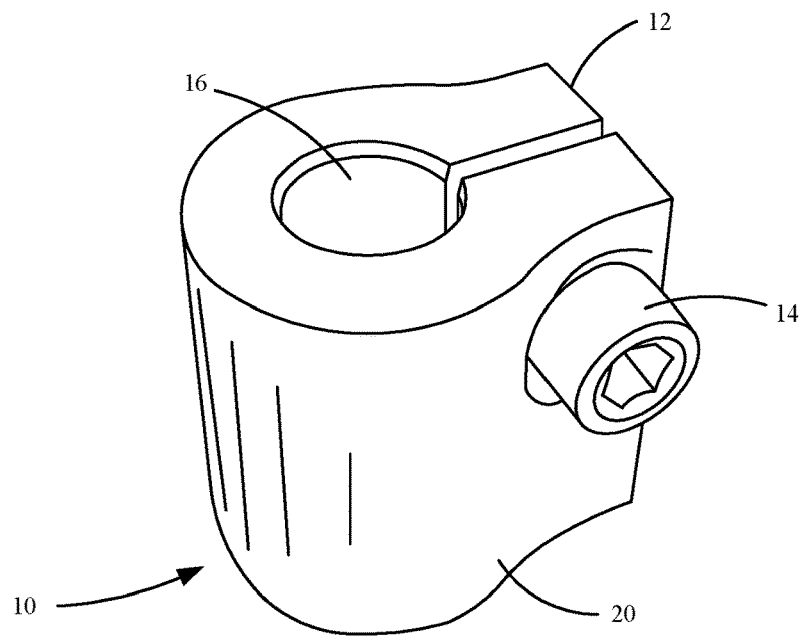
FIG. 1 illustrates a prior art coupler.
Figure 1:
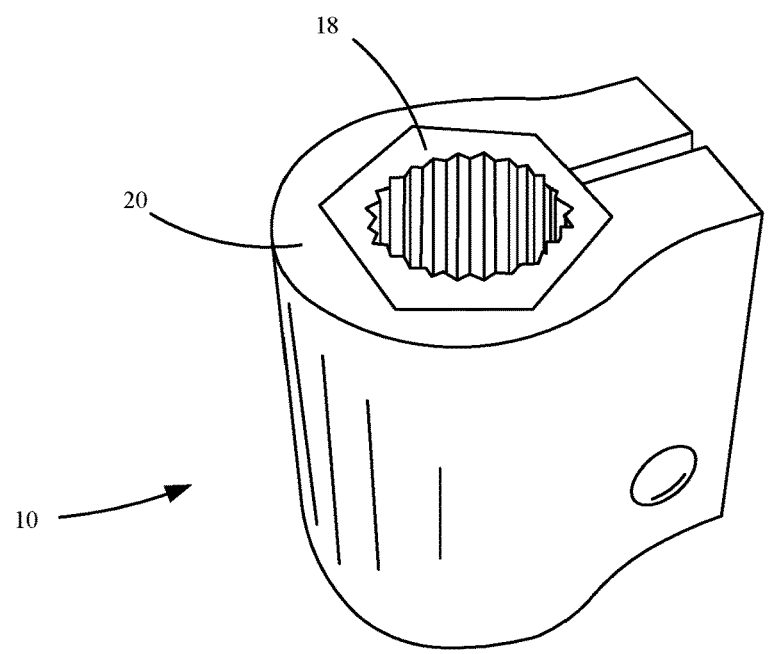

FIG. 1 illustrates a servo adapter assembly known in prior art. Adapter assembly 10 comprises the adapter body 20, a clamp 12, a fastener 14, a bore 16 and a broached insert 18. Bore 16 receives an auxiliary shaft and broached insert 18 receives a hobby servo motor splined shaft, such that when the servo motor splined shaft is rotated, energy is transferred through adapter body 20 and the auxiliary shaft is also rotated. The auxiliary shaft is secured in bore 16 by clamp 12. Clamp 12 is tightened by fastener 14. Broached insert 18 is not permanently attached to adapter body 20, instead broached insert 18 is an exchangeable insert. Broached insert 18 may be exchanged to accommodate for a different servo motor splined shaft. One disadvantage of using the shown broached insert 18 is that the coupling adapter body 20 to a servo motor requires an additional fastener inserted longitudinally through bore 16 into the servo motor splined shaft.

Figure 2:
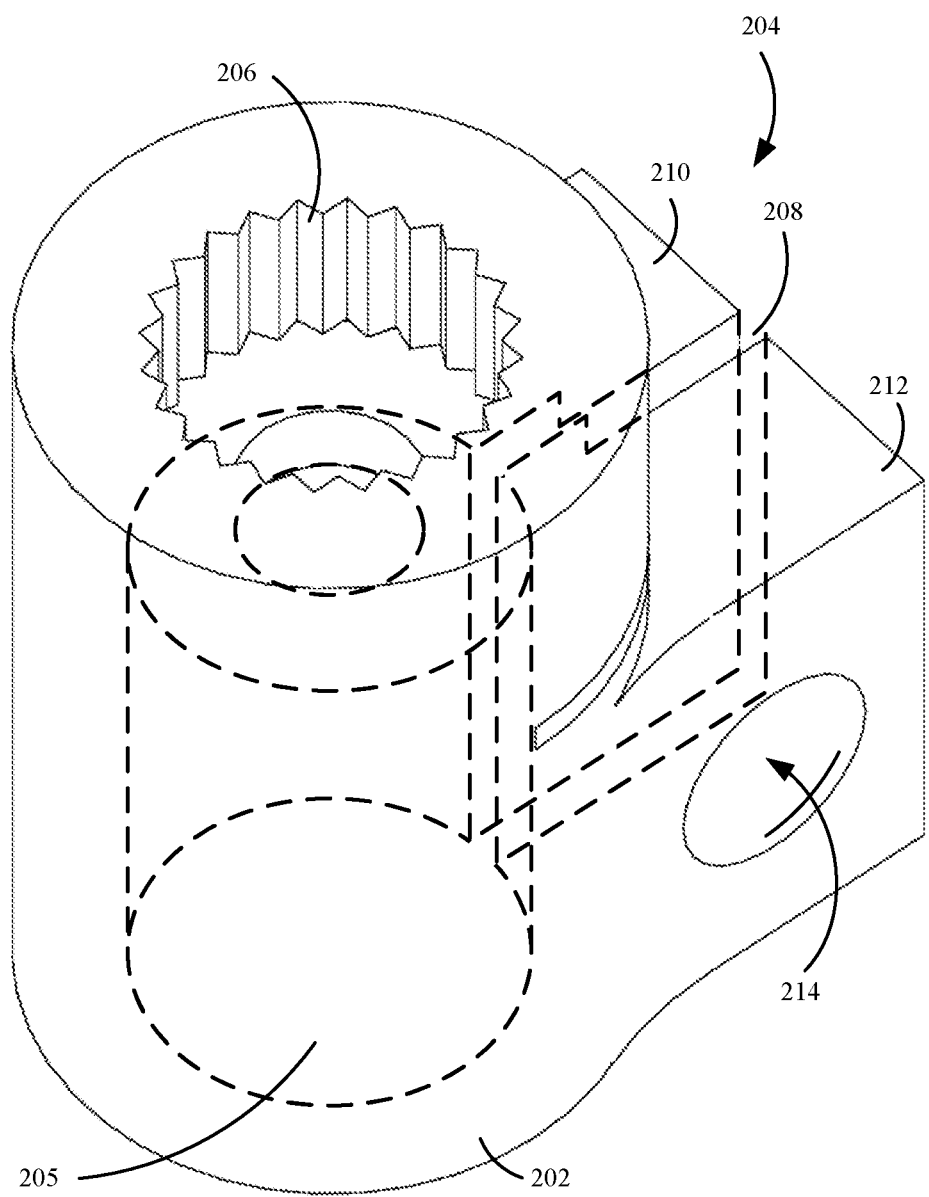
FIG. 2 illustrates a perspective view of a servo coupler, in accordance with an example of the present invention.

FIG. 2 illustrates a servo adapter, in accordance with an example of the present invention. Coupler 200 comprises a body 202, a clamp 204, an auxiliary shaft receiver 205, and a servo shaft receiver 206. Servo shaft receiver 206, as shown, is manufactured as part of body 202. In one example, servo shaft receiver 206 is an insert similar to broached insert 18 in FIG. 1. In one example, body 202 can comprise aluminum. In other examples, body 202 comprise other suitable materials such as ABS, nylon, acetyl, etc. Servo shaft receiver 206 is shaped to receive a splined output shaft of a hobby servo motor. Accordingly, servo shaft receiver 206 may be in any suitable shape to engage with an output shaft of a servo motor.

Figure 7:
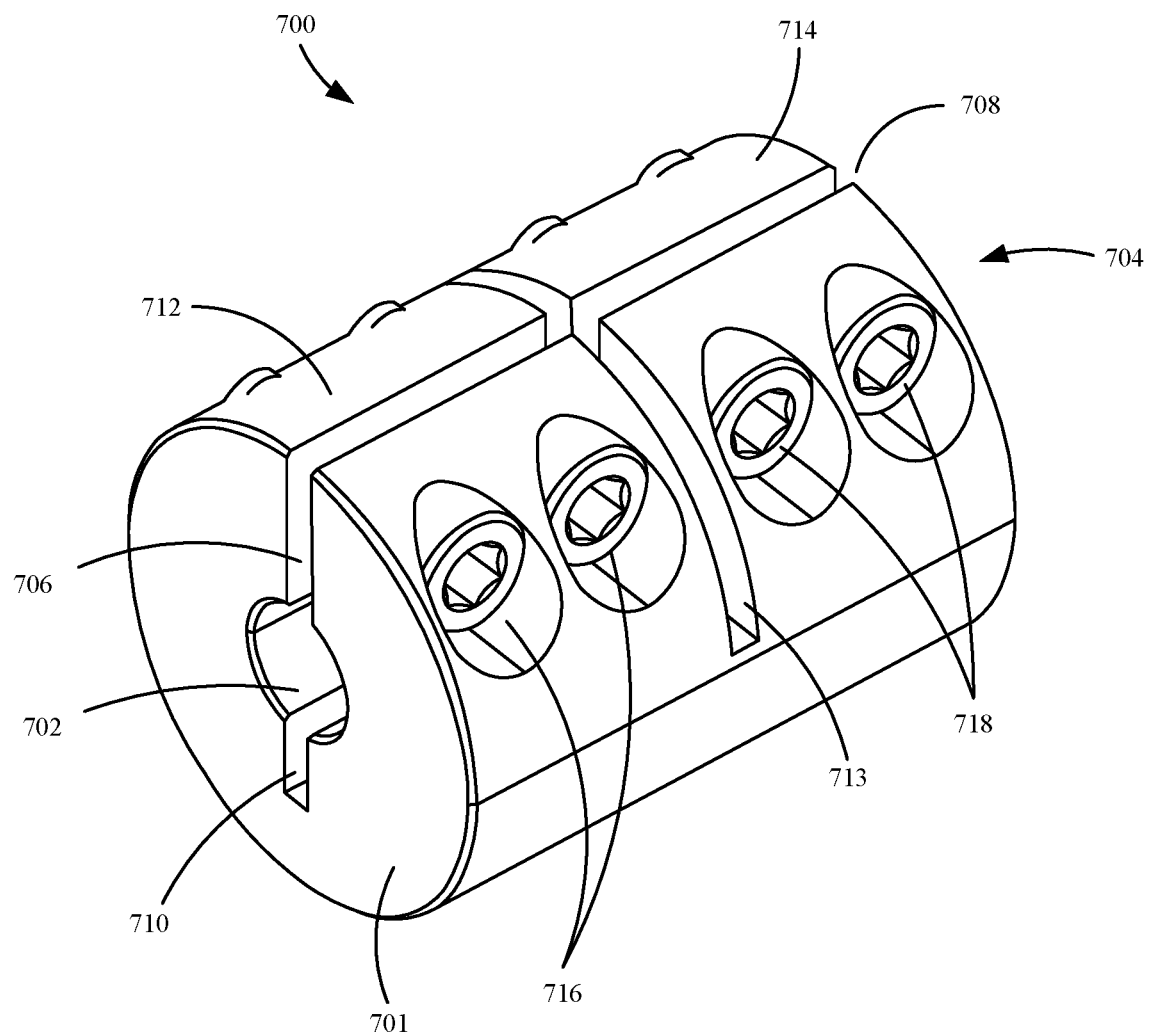
FIG. 7 illustrates a perspective view of a servo coupler in accordance with an example of the present invention.

Coupler 200 also comprises a clamp 204. Clamp 204 comprises a first portion 210, a second portion 212, a slit 208 and a bore 214. First portion 210 and second portion 212 each have a lateral bore 214 extending there through. As shown, clamp 204 works by inserting a fastener into bore 214 and tightening the fastener. In one example, there is more than one bore 214 and more than one fastener. For example, as shown in FIG. 7. Tightening the fastener brings first portion 210 and second portion 212 closer together and reduces the width of slit 208. Since auxiliary shaft receiver 205 is in communication with slit 208, when the width of slit 208 is reduced so is the cross-section of auxiliary shaft receiver 205. This tightens auxiliary shaft receiver 205 on to a shaft received therein.

Figure 3A:
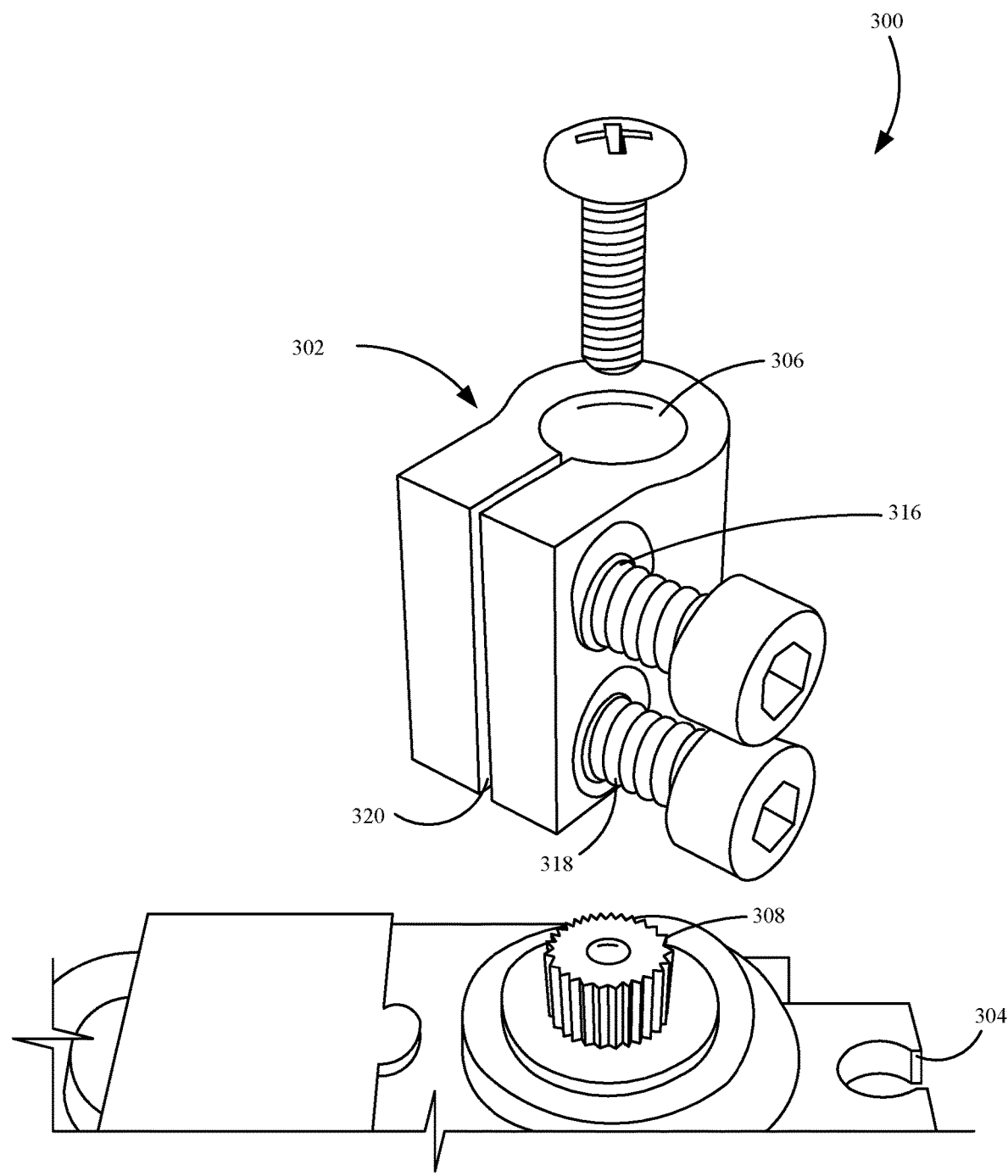
FIG. 3A illustrates a pre-coupled coupler assembly, in accordance with an example of the present invention.

FIG. 3A illustrates a pre-coupled coupler assembly, in accordance with an example of the present invention. Assembly 300 comprises a coupler 302 and a servo 304. Servo 304 comprises a servo shaft 308. Servo shaft 308 is the output of servo 304 and can be shaped in any suitable driveshaft shape. Some examples of suitable shafts are D-shaped, A1 Sub-micro Spline (15 teeth), B1 Mini Spline (25 teeth), C1 Standard Spline (24 teeth), H25T Hitec Standard Spline (25 teeth), D1 Heavy Duty Spline (15 teeth), 1F Spline (15 teeth), 2F Spline (21 teeth), 3F Standard Spline (25 teeth) and 4F Spline (25 teeth).

Coupler 302 comprises an auxiliary bore 306, a first clamp portion 316, second clamp portion 318 and a servo bore 310. When second clamp portion 318 is tightened, so is servo bore 310. Auxiliary bore 306 is located on the top side of coupler 302 and is configured to receive an auxiliary shaft. Auxiliary bore 306 is in communication with a slit of first clamp portion 316, such that when first clamp portion 316 is tightened so is auxiliary bore 306. Servo bore 310 is located on the underside of coupler 302 and is configured to mate and couple to servo shaft 308. Servo bore 310 is in communication with a slit of second clamp portion 318. In one example, because of this communication servo bore 310 may have fewer splines/mating features than servo shaft 308. For example, servo bore 310 may have 23 female splines, while servo shaft 308 has 24 male splines. In this example, the extra male spline is received by slit 320.

In the shown example of FIG. 3A, first clamp portion 316 and second clamp portion 318 share a slit. In another example, the slits of first clamp portion 316 and second clamp portion 318 are divided by a horizontal slit, such that tightening of either first clamp portion 316 or second clamp portion 318 does not affect the other portion.

Figure 3B:
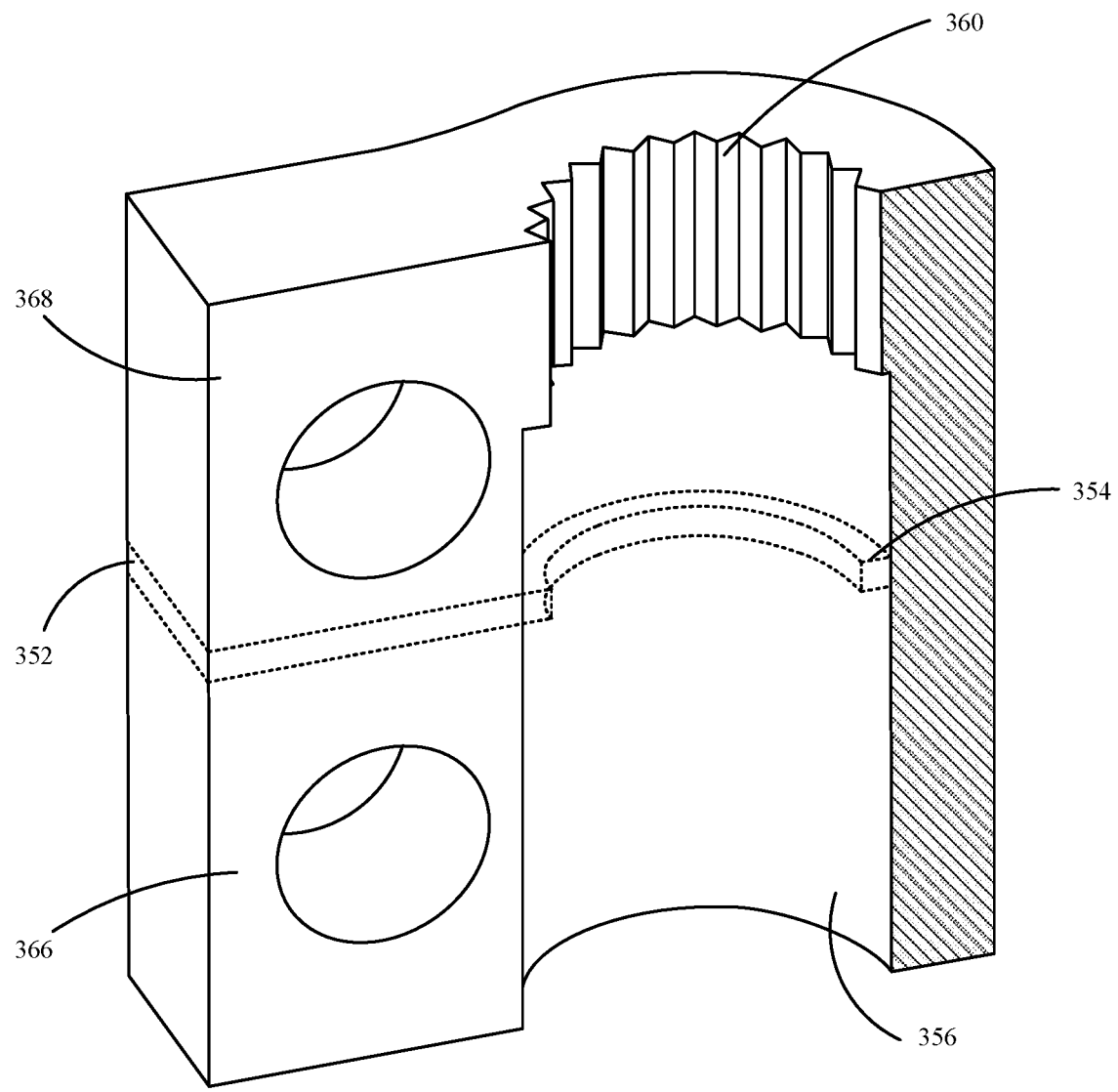
FIG. 3B illustrates a cutaway view of a coupler, in accordance with an example of the present invention.

FIG. 3B illustrates a cutaway view of a coupler, in accordance with an example of the present invention. FIG. 3B illustrates a cutaway view of coupler 302 along plane 330. In the shown example, coupler 302 comprises an auxiliary shaft bore 356, a servo shaft bore 360, a first clamp portion 366 and a second clamp portion 368.

In one example coupler 302 comprises a divider 354. Divider 354 may help prevent a shaft being inserted into auxiliary shaft bore 356 too deeply. If the shaft is inserted too deeply it can prevent a proper clamping force on a servo shaft inserted into servo shaft bore 360. In one example, without divider 354, auxiliary shaft bore 356 is wider at its opening and narrows toward servo shaft bore 360 to prevent an auxiliary shaft from being inserted to deeply.

In one example, coupler 302 comprises a horizontal slit 352. Horizontal slit 352 may divide first clamp portion 366 and second clamp portion 368, such that tightening of either first clamp portion 366 or second clamp portion 368 substantially does not affect the clamping of the other portion. Horizontal slit 352 may also prevent twisting of tab 358 when one portion is tightened and the other is not.

In one example, servo shaft bore 360 comprises female splines 372. In the example of 3B, female splines 372 protrude outward from inner bore surface 370 (e.g. at point 371). In another example, female splines 372 are inset within inner bore surface 370.

Figure 4:
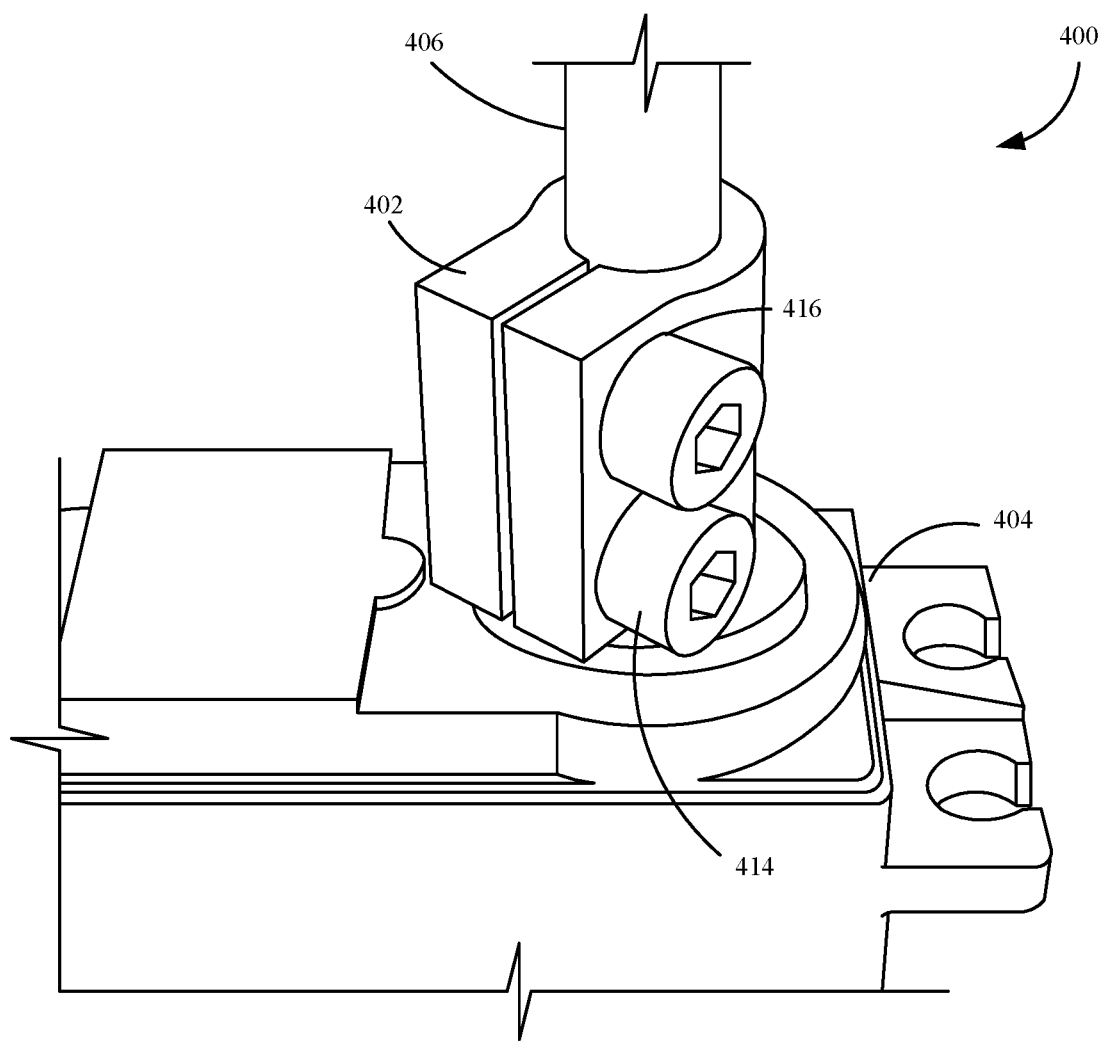
FIG. 4 illustrates a coupled coupler assembly in accordance with an example of the present invention.

FIG. 4 illustrates a coupled coupler assembly in accordance with an example of the present invention. Coupler assembly 400 comprises a servo 404, coupler 402 and an auxiliary shaft 406. As shown, auxiliary shaft 406 is driven by servo 404 through coupler 402. Coupler 402 comprises a first clamp portion 416 and a second clamp portion 414. First clamp portion 416 couples coupler 402 to auxiliary shaft 416. Second clamp portion 414 couples coupler 402 to servo 404.

Figure 5:
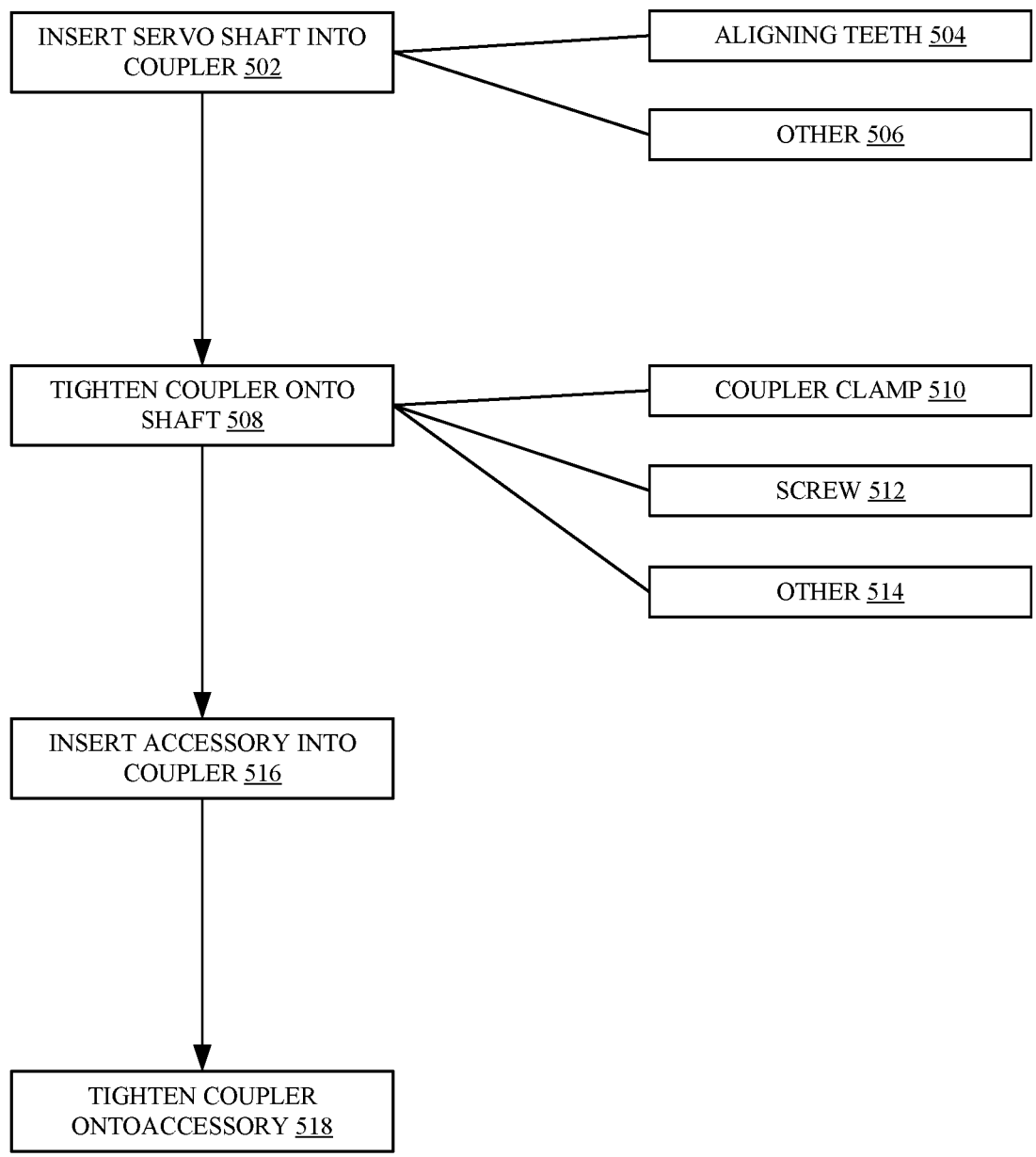
FIG. 5 illustrates a flow chart of a method of coupling in accordance with an example of the present invention.

FIG. 5 illustrates flow chart of a method of coupling in accordance with an example of the present invention. Method 500 may be useful in coupling an auxiliary shaft to a hobby servo motor. Method 500 will be explained in conjunction with FIGS. 6A-E.

Figure 6A:
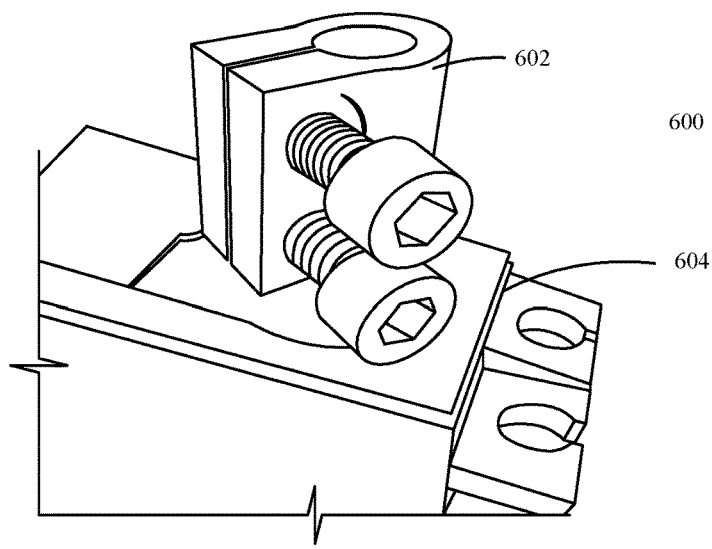
FIG. 6A-E illustrate example steps of a method of coupling in accordance with an example of the present invention.

At block 502, a servo shaft is inserted into a coupler. An example of insertion is shown in FIG. 6A. In FIG. 6A, a driveshaft of servo 604 is inserted into coupler 602 along axis 603. Inserting of the driveshaft into coupler 602 may require aligning of teeth, as indicated by block 504. Insertion may require other steps as well as indicated by block 506.

Figure 6B:
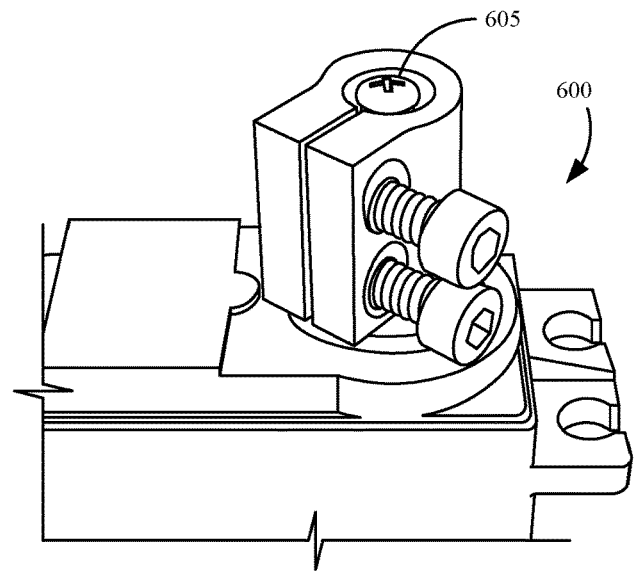

At block 508, the coupler 602 is tightened on to the shaft of the servo 604. As shown in FIG. 6B, a screw 605 may be used to tighten the coupler 602 on to the servo shaft, which is also indicated by block 510. In some cases, using a screw 605 to secure coupler 602, requires that a coupled accessory be removed before screw 605 can be removed.

Figure 6C:
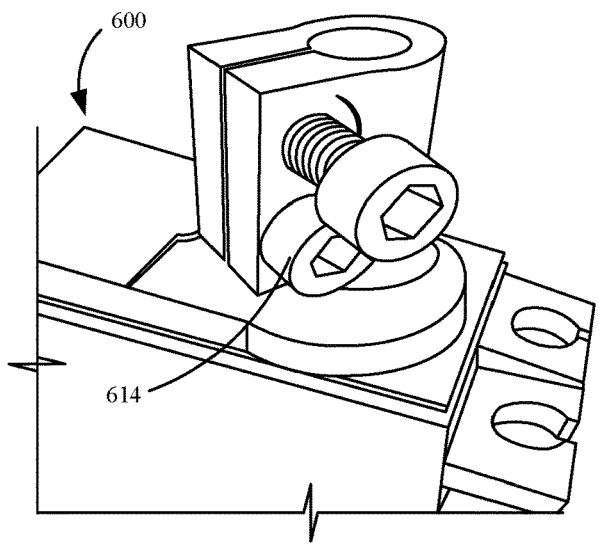
Figure 6D:
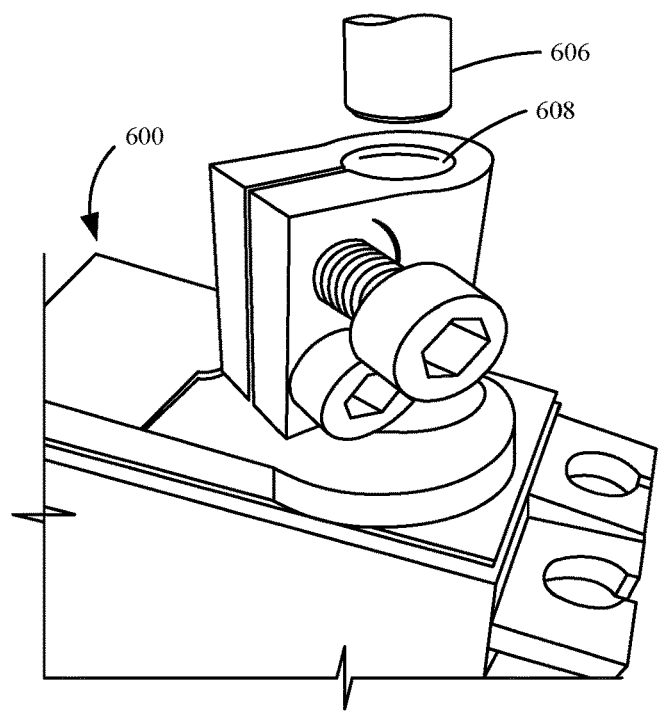
Figure 6E:
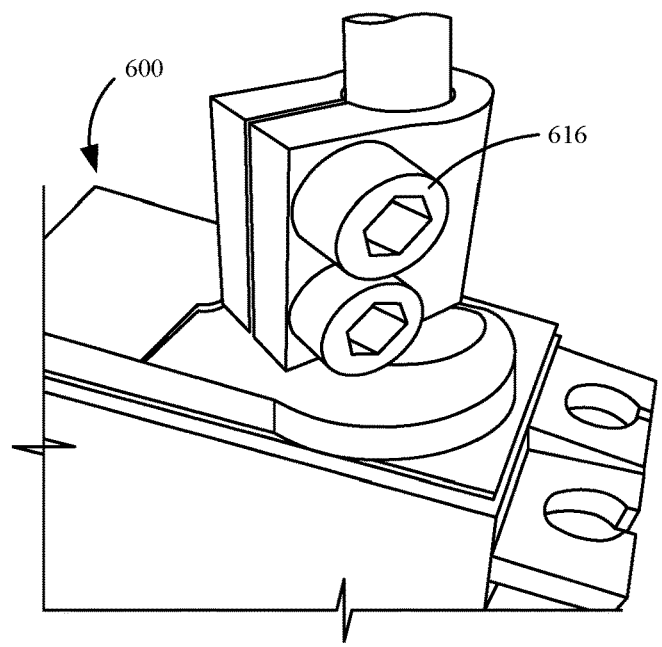

As shown in FIG. 6C, a coupler clamp 614 may be used to couple coupler 602 to servo shaft, this is also indicated by block 512. One advantage of using a coupler clamp 614 is that a couple the accessory does not have to be removed before coupler 602 can be removed from the servo shaft. Tightening may be accomplished by other steps as well as indicated by block 514.

At block 516, an accessory 606 is inserted into the coupler 602. As shown accessory 606 is an auxiliary shaft. However, in other examples, accessory 606 can be another suitable object. Accessory 606 is received by bore 608. Bore 608, in one example, is shaped to correspond with accessory 606. For example, as shown, bore 608 is a 0.25" circle and accessory 606 is a 0.25" shaft. In one example, accessory 606 is a lead screw.

At block 518, coupler 602 is tightened on to the accessory 606. As shown in FIG. 6C coupler 602 is tightened on to the accessory 606 by a clamp portion 616. In one example, clamp portion 616 is tightened by a fastener.

FIG. 7 illustrates a perspective view of a servo coupler in accordance with an example of the present invention. Coupler 700 comprises a body 701, an auxiliary shaft bore 702, a servo shaft bore 704, a first clamping portion 712 and a second clamping portion 714. In one example, body 701 is substantially cylindrical and first clamping portion 712 and second clamping portion 714 are within cylindrical body 701.

First clamping portion 712 comprises a slit 706 and fasteners 716. Fasteners 716, when, tightened reduce the width of slit 706. Slit 706 is in communication with auxiliary bore 702, and therefore, when slit 706 is reduced in width, a cross section dimension of auxiliary bore 702 is decreased. In one example, slit 706 has a portion 710 that extends beyond auxiliary bore 702. Portion 710 extends further away from fasteners 716 into body 701, in one example, thereby increasing the leverage fasteners 716 exert on reducing auxiliary bore 702. In one example, slit 708 also extends similarly to portion 710.

Second clamping portion 714 comprises a slit 708 and fasteners 718. Fasteners 718, when tightened, reduce the width of slit 708. Slit 708 is in communication with servo shaft bore 704, and therefore, when slit 708 is reduced in with a cross section dimension of servo shaft 704 is reduced. Servo shaft bore 704 is shaped, in one example, to receive a servo motor output shaft or other driving shaft. In one example servo shaft bore 704 is similar to servo shaft bore 206 of FIG. 2.

Second clamping portion 714, in one example, is separated from first clamping portion 712 by lateral slit 713. Lateral slit 713, in one example, may reduce the "twisting" of body 710 when one clamping portion is tightened and the other is not.

Examples of the present invention provide many improvements and features not currently in use. One of these features includes the coupler having splines integrated within the body instead of requiring a broached insert. Another new feature is the clamping spline bore that reduces the need of a fastener to hold a coupler onto a splined output shaft. Additionally, there are other new features disclosed herein not found in any past disclosures.

Although the present invention has been described with reference to preferred examples, workers skilled in the art will recognize that changes may be made in form and detail without departing from the spirit and scope of the invention.

What is claimed is:

1. A coupler for coupling an output shaft of a servo to an auxiliary shaft, comprising:
    a coupler body having a longitudinal axis extending from a first end to a second end, wherein the coupler body comprises:
    a first bore centered on the longitudinal axis and extending into the first end a first distance, the first bore configured to accept a portion of the auxiliary shaft;
    a second bore centered on the longitudinal axis and extending into the second end a second distance;
    a first fastener disposed proximate the first end, wherein adjusting the first fastener deforms a cross sectional dimension of the first bore;
    a slit formed in the coupler body, the being substantially perpendicular to the longitudinal axis, the slit being configured to reduce deformation of the second bore as the first fastener deforms the cross sectional dimension of the first bore;
    and
    wherein an inner surface of the second bore has a female spline configuration to accept and engage a splined portion of the output shaft of the servo, the female spline configuration having at least one less spline than the splined portion of the output shaft.

2. The coupler of claim 1, wherein the slit extends at least halfway through the coupler body.

3. The coupler of claim 2, wherein the coupler body has a first lateral bore extending therethrough, wherein the first lateral bore is configured to accept a first laterally positioned fastener, which when actuated, causes the coupler body proximal the first bore to deform.

4. The coupler of claim 3, wherein the coupler body has a second lateral bore extending therethrough, wherein the second lateral bore is configured to accept a second laterally positioned fastener, which when actuated, causes the coupler body proximal the second bore to deform.

5. The coupler of claim 2, a third fastener configured to extend from the first bore, through an orifice into the second bore, wherein the third fastener is configured to engage the output shaft of the servo to secure the adapter to the output shaft.

6. The coupler of claim 2, wherein the coupler body has a second slit formed therein, wherein the second slit is substantially perpendicular to the first slit.

7. The coupler of claim 2, wherein the coupler body has a generally cylindrical portion with a tab that extends laterally from the cylindrical portion; and wherein the slit extends outward through the tab.

8. The coupler of claim 1, wherein the first bore and second bore are abutted to and separated by a divider.

9. The coupler of claim 1, wherein the coupler body comprises aluminum.

10. A servo motor for hobby applications configured to be coupled to an auxiliary shaft, the servo motor comprising:
    a rotatable output shaft having a male spline configuration; and
    a coupler having a first end and a second end, the coupler coupled to the rotatable shaft, wherein the couple comprises:
    a generally cylindrical portion;
    a tab that extends laterally from the generally cylindrical portion, the tab having a slit that extends from the first end of the coupler to the second end of the coupler;
    a first bore centered on a longitudinal axis and extending from the first end of the coupler toward the second end of the coupler, the first bore configured to accept a portion of the auxiliary shaft, wherein narrowing a first width of a first portion of a slit causes the first bore to frictionally engage the portion of the auxiliary shaft; and
    a second bore centered on the longitudinal axis and extending from the second end of the coupler toward the first end of the coupler, configured to accept and positively engage a portion of the output shaft of the servo motor and wherein narrowing a second width of a second portion of the slit causes the second bore to frictionally engage the portion of the output shaft of the servo motor and wherein the second bore comprises a mating female spline configuration that comprises at least one fewer female spline than the male spline configuration.

11. The servo motor of claim 10, wherein the coupler comprises a first fastener that compresses the first portion of the slit and a second fastener that compresses the second portion of the slit.

12. The servo motor of claim 10, wherein the coupler comprises a third fastener that compresses the first portion of the slit and a fourth fastener that compresses the second portion of the slit.

13. The servo motor of claim 10, wherein the at least one fewer female spline is displaced by the slit, such that the female spline configuration is capable of mating with the male spline configuration.

14. An apparatus for attachment to an output shaft of a servo, the apparatus comprising:
    a body having a longitudinal axis, a first end, a second end, and a longitudinal slit comprising a first portion with a first width and a second portion with a second width;
    a first bore extending into the first end and aligned with the longitudinal axis, the first bore being in communication with the first portion, wherein adjustment of the first portion to a third width different from the first width changes a size of the first bore; and
    a second bore extending into the second end and aligned with the longitudinal axis, the second bore being in communication with the second portion, wherein adjustment of the second portion to a fourth width different from the second width changes a size of the second bore, and wherein the second bore comprises a mating female spline configuration that comprises at least one fewer female spline than a male spline configuration of the output shaft of the servo.

15. The apparatus of claim 14, wherein the first portion and second portion are divided by a perpendicular slit that is substantially perpendicular to the longitudinal slit.

16. The apparatus of claim 14, wherein adjustment of the second portion is made by a first fastener.

17. The apparatus of claim 16, and further comprising:
    a divider integrated with a portion of material that forms the body and positioned between the first bore and the second bore and having an orifice that extends from the first bore to the second bore; and a second fastener configured to extend from the first bore, through the orifice and into the second bore, wherein the second fastener is configured to engage the output shaft of the servo to secure the apparatus to the output shaft.

* * * * *